March 10, 1925.

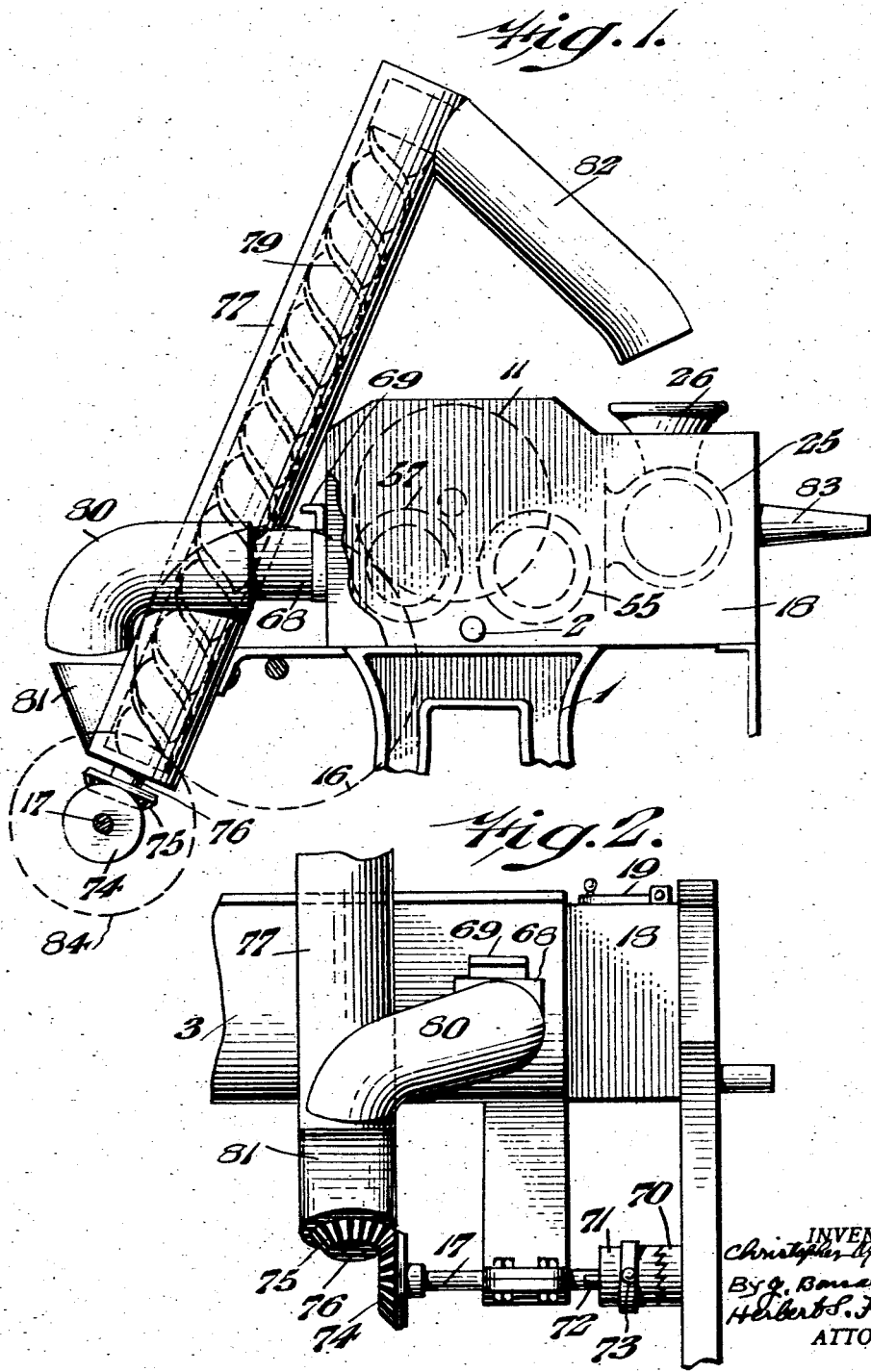

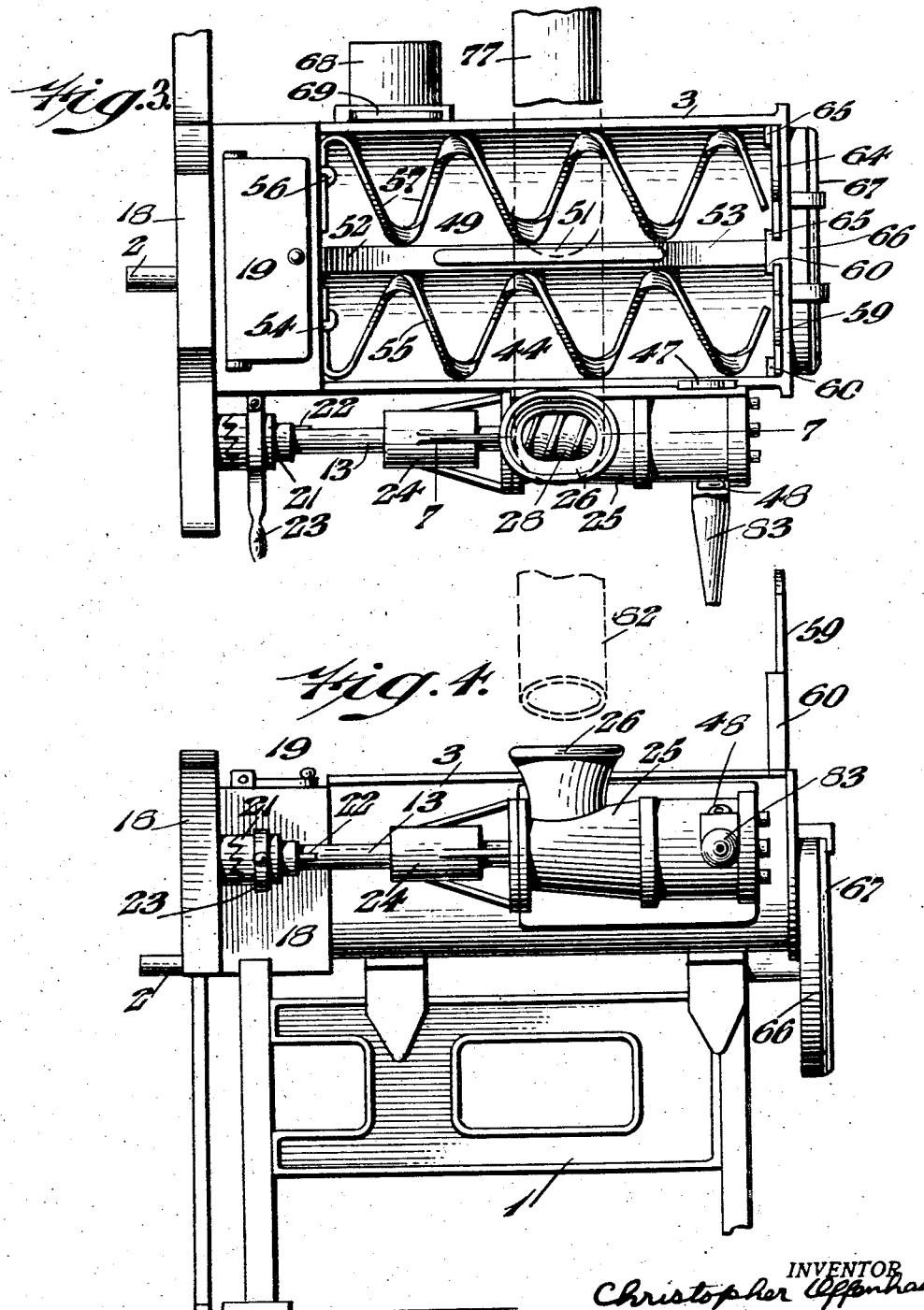

C. OFFENHAUSER

METHOD OF TREATING MATERIAL AND COMBINED CUTTING, MIXING, AND
STUFFING MACHINE THEREFOR

Filed July 3, 1924

INVENTOR
Christopher Offenhauser
ATTORNEYS

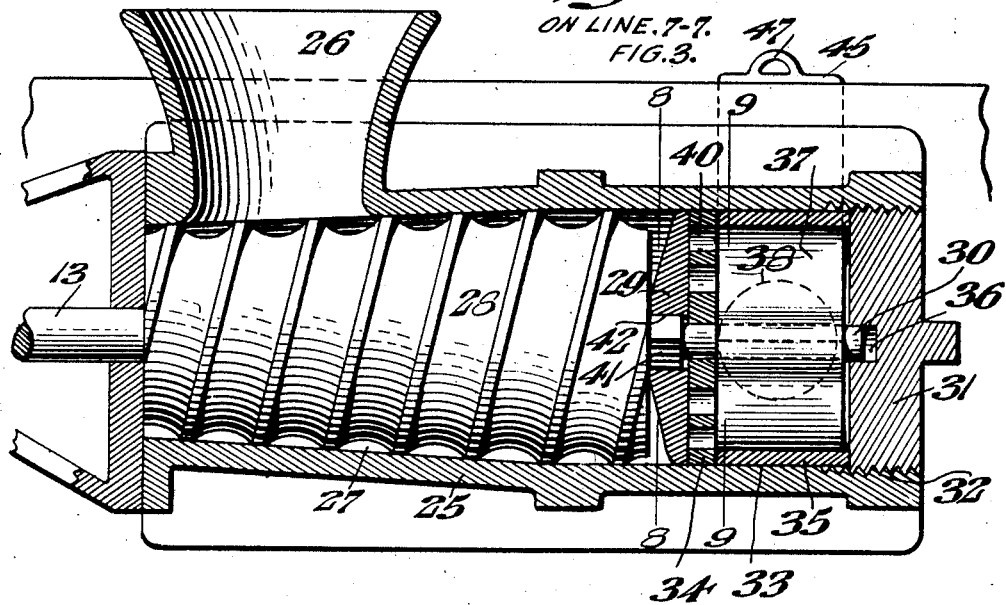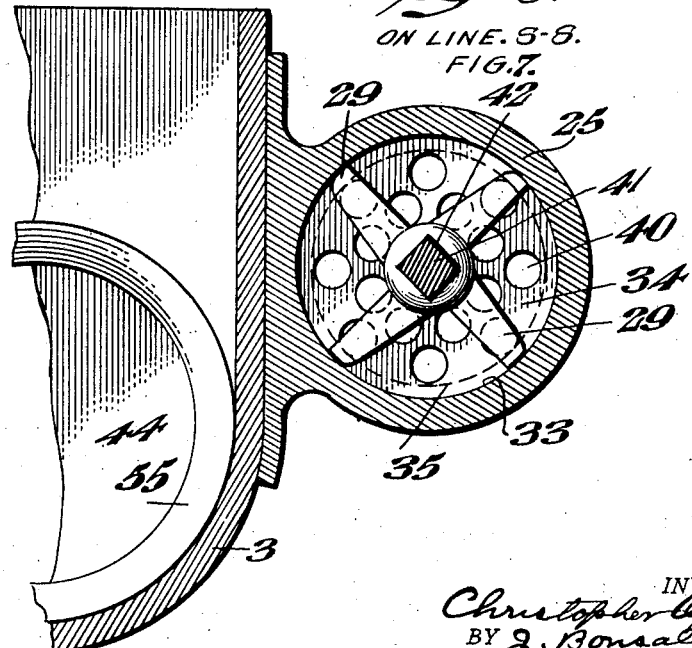

March 10, 1925.  1,528,887
C. OFFENHAUSER
METHOD OF TREATING MATERIAL AND COMBINED CUTTING, MIXING, AND
STUFFING MACHINE THEREFOR
Filed July 3, 1924    5 Sheets-Sheet 5
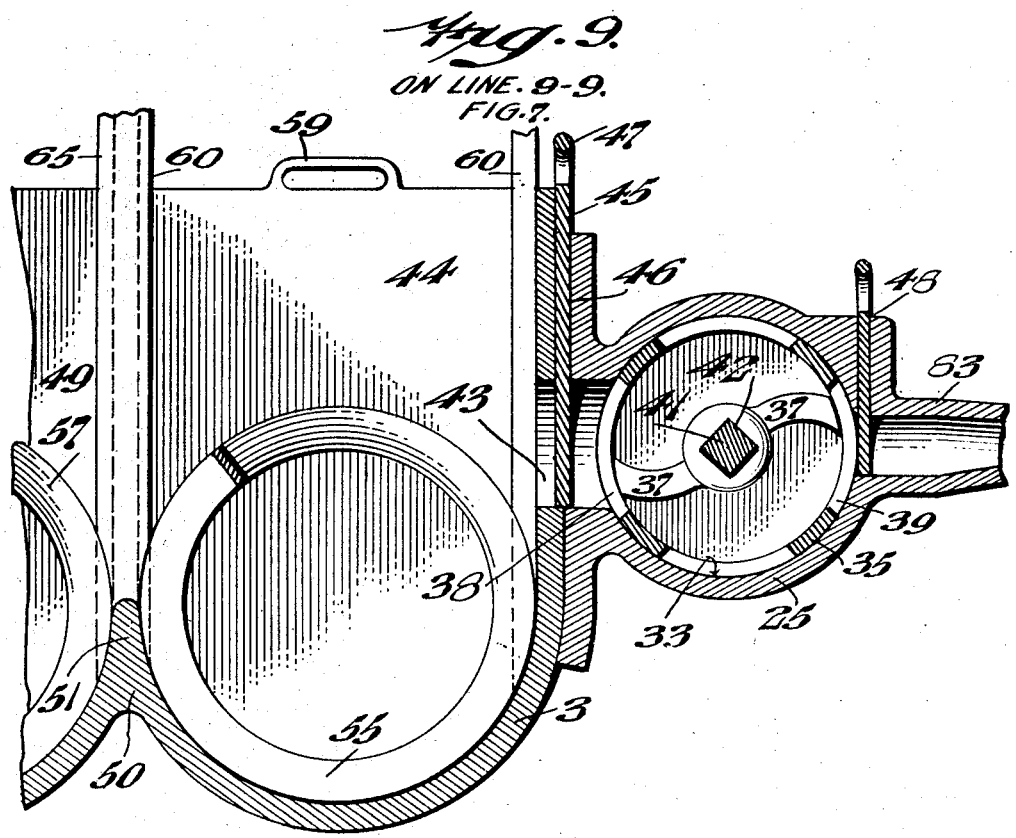
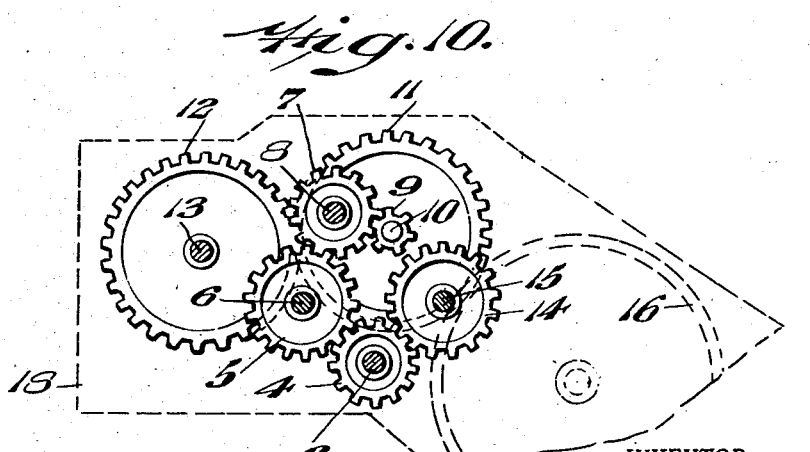

Patented Mar. 10, 1925.

1,528,887

UNITED STATES PATENT OFFICE

CHRISTOPHER OFFENHAUSER, OF PHILADELPHIA, PENNSYLVANIA.

METHOD OF TREATING MATERIAL AND COMBINED CUTTING, MIXING, AND STUFFING MACHINE THEREFOR.

Application filed July 3, 1924. Serial No. 724,022.

*To all whom it may concern:*

Be it known that I, CHRISTOPHER OFFENHAUSER, a citizen of the United States, residing at Philadelphia, county of Philadelphia, State of Pennsylvania, have invented a new and useful Method of Treating Material and Combined Cutting, Mixing, and Stuffing Machine Therefor, of which the following is a specification.

This invention relates to a novel construction and arrangement of an organized machine wherein the material may be first cut, and, thereafter, it passes to a second cutting mechanism and mixing mechanism wherein it is reduced to a desired degree of fineness and any desired condiments or other materials mixed with it. When the material is reduced to the desired degree of fineness it can be passed through the first cutting mechanism and by it fed to containers in which it is packed.

In the manufacture of sausage, for example, it has been necessary for the manufacturer, even though operating on a small scale, to employ a number of different machines, each with its individual driving motor, and this large number of machines not only took up a large amount of floor space, and increased the operating cost, but it also necessitated a large amount of labor in the handling of the material and in the transferring of it from one machine to another.

It is the object of my present invention to devise a single machine in which all of the above noted operations can be carried out, either independently or collectively of each other.

With the above and other objects in view, my invention comprehends a novel method of treating material, and a novel construction and arrangement of a combined machine wherein the material can be subjected to a single cutting operation and discharged from the machine; or wherein after the initial cutting operation it is passed to a mixing and cutting mechanism wherein the material is circulated until the desired mixing or cutting operation is effected; or wherein the material is simply mixed and discharged from the machine; or wherein the material after being subjected to the desired treatment is forced under pressure to a delivery spout in order to pack it in a container of any desired character.

It further comprehends a novel construction and arrangement of a combined machine wherein the material is automatically transferred from one mechanism to the other.

Other novel features of construction and advantage will hereinafter more clearly appear in the detailed description and the appended claims.

For the purpose of illustrating the invention, I have shown in the accompanying drawing a typical embodiment of it, which, in practice, will give reliable and satisfactory results. It is, however, to be understood that this embodiment is typical only and that the various instrumentalities of which my invention consists can be variously arranged and organized, and that the invention is not limited to the precise arrangement and organization of these instrumentalities as herein set forth.

Figure 1 is an end elevation of a combined cutting, mixing and stuffing machine embodying my invention.

Figure 2 is a side elevation of a portion thereof.

Figure 3 is a top plan view of the machine.

Figure 4 is a side elevation of the machine.

Figure 7 is a section on line 7—7 of Figure 3.

Figure 8 is a section on line 8—8 of Figure 7.

Figure 9 is a section on line 9—9 of Figure 7.

Figure 10 is an end elevation showing certain parts of the driving mechanism.

Similar numerals of reference indicate corresponding parts.

Figure 5:
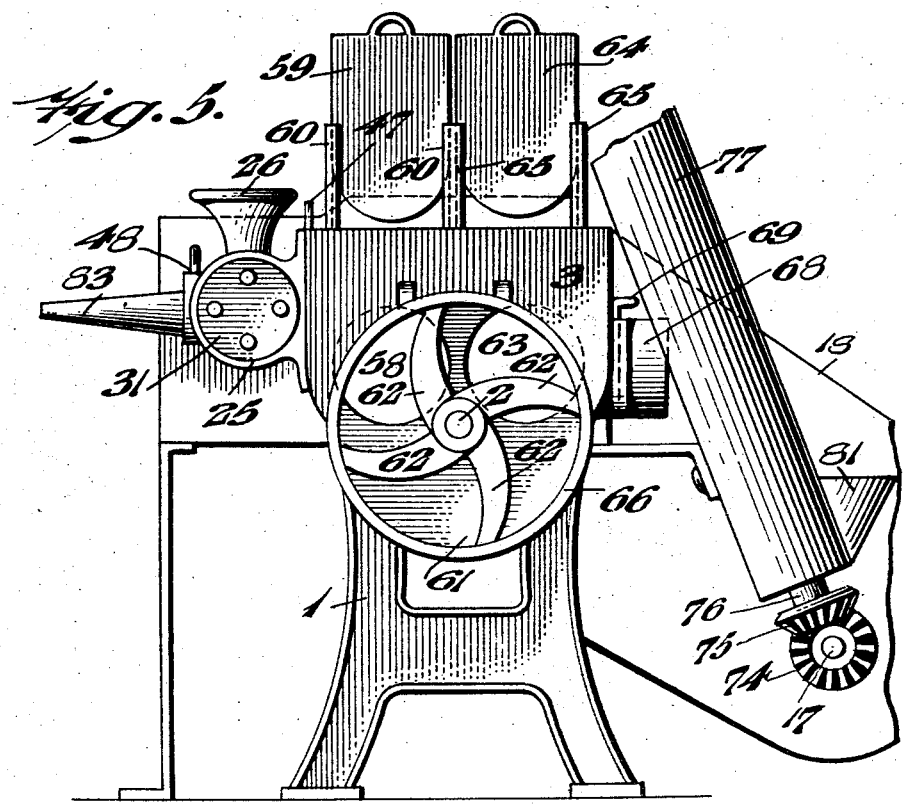
Figure 5 is an end elevation.

Referring to the drawings:

1 designates the supporting framework of a combined machine embodying my invention. 2 designates the main driving shaft which is suitably journalled on the casing 3, and which is adapted to be driven by any desired source of power. In practice, an electric motor is operatively connected with the driving shaft 2 in any desired or conventional manner.

The driving mechanism.

The driving shaft 2, see Figure 10, has secured to it a gear 4 which meshes with a gear 5 fixed on a shaft 6. The gear 5 meshes with a gear 7 fixed on a shaft 8. The gear 7 meshes with a pinion 9 fixed on a shaft 10, on which is also fixed a gear 11 which meshes with a gear 12 loosely mounted on a shaft 13.

The gear 4 meshes with a gear 14 fixed to a shaft 15.

The gear 11 meshes with a gear 16 which latter meshes with a gear 84 loosely mounted on a shaft 17.

The foregoing shafts are suitably journalled in a gear box 18 and with their gears constitute the driving mechanism for the machine. The gear box 18 has a removable cover 19.

Initial cutting mechanism.

Figure 6:
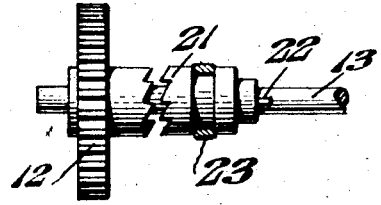
Figure 6 is a fragmentary section, showing more particularly a clutch employed.

The hub of the gear 12 is serrated to form part of a slip clutch, the movable part of which consists of a clutch collar 21 keyed to the shaft 13 at 22 in order to provide for its longitudinal adjustment on the shaft 13, see Figure 6. The clutch collar 21 is moved into its operative or inoperative position by means of a clutch handle 23. The shaft 13 is journalled in the bearing 24 and the inner end of the casing 25 of the initial cutting mechanism, see more particularly Figures 3, 4, and 7. The casing 25 has at its inner end a hopper 26.

The casing 25 is provided with a bore 27 which is of gradually increasing diameter for a desired distance, and within this bore is a conveyor 28 which is connected to and driven by the shaft 13 and causes the material which is fed into the casing 25 through the hopper 26 to be fed forwardly toward a cutting knife 29, having a plurality of cutting elements, and fixed to the shaft 13 in any desired manner to revolve in unison with it. The shaft 13 has a reduced end 30, see Figure 7, which has a bearing in the removable closure 31 which is in threaded engagement at 32 with the outer end of the casing 25. The tapered bore 27 merges into a cylindrical bore 33, and a pressure plate 34 is retained in close proximity to the knife 29 by means of a sleeve 35 which is retained in position by the closure 31. It will be seen that the closure 31 is recessed, as at 36, in order to provide a clearance for the outer end of the portion 30 of the shaft 17. The reduced end 30 has fixed to it the discharge blades 37, see also Figure 9, from which it will be seen that two of these blades are employed and that the sleeve 35 is provided with a discharge outlet 38 at one side and with a discharge outlet 39 at its opposite side. The blades 37 are preferably curved and at their outer periphery conform to the contour of the inner periphery of the sleeve 35, so that the tendency of such blades 37 will be to cause the material to be fed through the discharge opening 38 or through the discharge opening 39.

The plate 34 is in the form of a disc having spaced openings 40 extending through it, see more particularly Figures 7 and 8.

For convenience in mounting the knife 29, which as seen in Figure 8 is provided with a plurality of cutting blades, the shaft 13 has a polygonal contour as indicated at 41 and the knife 29 has its hub provided with a polygonally shaped opening 42, see Figure 7.

The discharge opening 38 communicates with a discharge passage 43, see Figure 9, which opens into a feed channel 44 of the casing 3, and the passage of material through this passage 43 is controlled by means of a manually actuated valve 45 which is slidable in slots 46 in the casing 25.

The valve 45, as illustrated, is in the form of a plate having its upper end apertured to form a grasping handle 47. The passage of material from the discharge port 39 is controlled by a valve 48 of similar construction to that of the valve 45. It will be seen that when this valve 48 is in its closed position, as seen in Figure 9, and the valve 45 is in its open position, the material which has been cut by the knife 29 will be discharged through the passage 43 into the channel 44 of the mixing and cutting mechanism which will now be described.

Mixing and cutting mechanism.

The casing 3 which is provided with the feed channel 44 as just described, is also provided with a feed channel 49, see Figure 3, and between these feed channels the casing 3 is extended upwardly as at 50, see Figure 9, to form an upwardly extending rib 51 which as shown in Figure 3, does not extend the full length of the casing 3 but terminates in such a manner so as to form a recess or passage 52 at the inner end of the casing, and a recess or passage 53 near the outer end of such casing 3.

The shaft 15, see Figure 3, terminates in a coupling 54 to which is detachably connected a conveyor 55. In a similar manner, the shaft 6 terminates in a coupling 56 to which is detachably connected a conveyor 57. It will be understood from Figure 10 and the detailed description of the operation that the conveyor 55 revolves in a clock-wise direction while the conveyor 57 revolves in a counter clock-wise direction.

The feed channel 44 at its outer end is provided with a discharge port 58 which is controlled by means of a valve 59 slidable in the guides 60 and substantially similar in construction to the valve 45 already described except that, as illustrated, the lower end of the valve 59 is rounded.

The discharge port 58 communicates with a cutting chamber 61, and the main driving shaft 2 which extends beneath the casing 3 has its forward end extending into the cutting chamber 61, as will be understood from reference to Figure 5. Secured to the forward end of the main driving shaft 2, in any desired or conventional manner, are the knives 62, and these knives in cutting through the material which is being treated, causes the cut material to pass through the discharge port 63, see Figure 5, and into the return feed channel 49. The port 63 is controlled by means of a valve 64, similar in construction to the valve 59 and slidable in the guides 65.

The conveyor 57 is so constructed at its inner end that, as the material passes to such inner end, it passes through the passage 52 into the feed channel 44, so that the material is fed continuously to and from the cutting knives 62 until it is reduced to a desired degree of fineness. During the feed of the material in the feed channels 44 and 49, which form mixing channels or chambers, any desired material or materials can be mixed with the material which has originally been fed into the casing 3. If, for example, sausage is being made, the sausage meat can have mixed with it any desired condiments.

In order to provide access to the knives 62 of the cutting mechanism, the casing portion 56 within which is contained the cutting chamber 61 is provided with a removable door or closure 67, see Figures 3 and 4, and this door is secured in position in any desired or conventional manner.

The casing 3 is provided with a discharge spout 68 which is controlled by means of a valve 69, see more particularly Figures 2 and 3, so that the material which has been treated can be automatically discharged from the machine into any desired type of receptacle, such as for example, a tub or truck.

I provide, however, means to automatically transfer the material discharged from the feed and mixing channel 49 to the hopper 26, and this transfer mechanism will now be described.

*Transfer mechanism.*

The gear 84 is loosely mounted on the shaft 17 and its hub is provided with the clutch teeth 70, see Figure 2, which are adapted to co-operate with the teeth of the clutch collar 71 keyed to the shaft 17 by means of the key 72, so that this clutch collar 71 is longitudinally adjustable on the shaft 17 by means of the clutch handle 73. The shaft 17 has fixed to it a gear 74, which meshes with the gear 75 fixed to a conveyor shaft 76, which is mounted in a conveyor casing 77, supported in any desired manner.

The shaft 76 actuates the conveyor 79. The discharge spout 68 has detachably connected with it an elbow 80 which can be swung into such position that the material passing therethrough will be discharged into the opening 81, so that the conveyor 79 will raise the material, and, when such material reaches the upper end of the conveyor casing 77, it discharges therefrom through the conduit 82 so that it will be received in the hopper 26, see more particularly Figure 1.

The material is now ready to be packed in any desired type of a container such as, for example, a sausage casing. In case sausage is to be made, the knife 29 may be removed or left in place as may be desired. The material passes through the bore 27 and into the chamber formed by the sleeve 35, and, assuming that the valve 45 is closed and the valve 48 is opened, the material will be discharged under pressure through the stuffing spout 83.

The operation will now be apparent to those skilled in the art to which the invention appertains and is as follows:

We will assume first that the different valves and clutches are so adjusted that the entire cutting, mixing and transfer mechanism is to be used.

The material to be treated is placed in the hopper 26, and, assuming that the driving shaft 2 is being driven, the gear 4 will drive the gear 5 with which it meshes, and this gear 5 will drive the gear 7 which is in mesh with the gear 9, thereby causing the revolution of the shaft 10 to which is connected the gear 11 which drives the gear 12. If the clutch collar 21 is in its clutched position, the shaft 13 will be driven thereby effecting the revolution of the conveyor or feed screw 28. The material will be fed under pressure to the cutting knife 29 which effects a shear cut on the material, and the cut material passes through the apertures 40 in the disc 34 into the chamber formed within the sleeve 35. The blades 37 cause the initially cut material to be discharged through the discharge port 43 into the first feed channel 44.

The gear 4 which meshes with both conveyors 5 and 14 causes the shafts 15 and 6 to revolve in opposite directions, and thereby effects the revolution in opposite direction of the conveyors or feed screws 55 and 57. The conveyor 55 feeds the material forwardly so that it passes through the discharge port 58 into the cutting chamber 61, wherein it is cut by the knives 62. The material passes from the cutting chamber 61 through the port 63 into the feed channel 49 in which the material is fed rearwardly towards the inner end of the casing 3. If the valve 69 is closed, the material will pass through the recess 52 into the feed channel 44, and the material will be continuously fed to and from the cutting knives 62 until it is reduced to the desired degree of fineness. During this passage of the material in the channels 44 and 49, a mixing action takes place, and the condition of the material can be readily tested by the operator, and any desired material or materials can be added.

As soon as the material has been subjected to the desired treatment, the valve 69 is opened and the material is discharged through the discharge spout 68. If the elbow 80 is turned so as to discharge into the opening 81 of the conveyor 77, the material which has been treated is raised by the conveyor 79 and passes down the conduit 82 into the hopper 26, and then passes as before described to the stuffing spout 83. If the finished product is for example sausage, the sausage casings are assembled on the spout 83, and the material is forced under pressure into said sausage casing.

If the material is to receive only a rough cut or an initial cutting action, the valve 45 is closed and the valve 48 is opened, so that the material will discharge through the spout 83.

The material after receiving the first cutting operation can be subjected to a further cutting and mixing action, and during the time in which this action is taking place, the clutch collar 21 can be moved into its declutched position, so that a minimum of power is employed, and, in a similar manner, the clutch collar 71 of the transfer mechanism can be moved into its declutched position.

When it is desired to transfer the material which has been cut, the clutch collar is moved into its clutched position.

If it is not desired to give the material an initial or rough cut before introducing it into the feed channel 44 or 49, the clutch collar 21 can be moved into its declutched position, and the material can be placed in either of the feed channels 44 or 49, or both, and subjected to either a mixing action alone, or to a mixing and cutting operation.

In case it is only desired to mix the material, it is placed in the feed channel 44 or the feed channel 49 or both, and the valves 59 and 64 would be closed so that a continuous circulation and mixing of the material will take place.

Under these conditions, the material will pass from the feed channel 44 through the recess 53 into the feed channel 49 and from the feed channel 49 through the recess 52 into the feed channel 44. The material can at any time be subjected to a cutting action by raising the valves 59 and 64, or the material may be automatically discharged from the machine when the valve 69 is moved into its opened position.

It will be apparent from the foregoing that, in accordance with my present invention, I have devised a novel construction and arrangement of a combined machine which will take but a minimum of floor space, and which can be manufactured, installed and operated at a minimum expense. Furthermore, any desired cutting, mixing and cutting, and stuffing operation can be carried on, so that the operator will not have to handle the material or to manually transfer it from one mechanism to another.

It will thus be seen that a person with a small establishment can accomplish in a single machine, the different operations which have heretofore required the use of a large number of different and independent machines.

When meat of any kind is being treated, it is subject to Government inspection and great care must therefore be taken that the machine is at all times in a sanitary condition, and it is also important that the hands of the operators do not come into contact with the material. In accordance with this invention, the meat or other articles being treated are untouched by the hands of the operator while being treated and the treated material is automatically discharged from the machine into the packages or containers which are to receive it. The machine can be easily cleaned and can be maintained at all times in a sanitary condition.

In the description, I have referred to the manufacture of sausage as one use for which my present invention is especially designed, but it is to be understood, that in the broad and generic scope of the invention any desired material or materials may be treated and these materials may be of a semi-liquid, paste, powdered or solid nature, and one or more may be of a liquid nature.

As ordinarily employed, the initial cutting means would be operated until the feed channels of the second mixing and cutting mechanism, which form a storage chamber, are filled to the desired extent.

The material then circulates in a closed path until the desired mixing operations have taken place and during this mixing operation any desired condiments or other materials may be added to the batch. After the desired mixing operation has been completed, the valves 59 and 64 are opened so that the material will circulate to and from the cutting mechanism until it is reduced to the desired degree of fineness. It can then be packed into any desired type of containers, as hereinbefore explained.

It will be apparent that the storage chamber formed by the feed and mixing channels can be of any desired dimension, and, preferably, it is much larger than the casing of the initial cutting means, since the larger the batch which is mixed and cut, the more uniform is the final product.

In some cases in packing the material into containers, it can discharge from the discharge outlet 68 directly into the containers or it can discharge from the conduit 82 into such containers, so that it is not necessary in all cases to pass it through the initial cutting means. If it is passed through the initial cutting means, it is forced into containers under pressure.

It will be apparent to those skilled in this art, that if in the mixing operation it is not desired to cut the material and it is desired to provide a more intensive mixing action, mixing blades of various forms may be substituted for the cutting knives 62. The form of mixing blade varies with different materials.

The delivery spouts or discharge outlets which convey the material to the container may have any desired conformation and the outlet may be a full size opening as the conduit 82 or a restricted opening as the spout 83.

It will now be apparent that I have devised a new and useful method of treating material and combined cutting, mixing and stuffing machine which embodies the features of advantages enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention, what I claim as new and desire to secure by Letters Patent, is:

1. In a combined machine of the character described, means to initially cut the material, and cutting and mixing mechanism to which the material is discharged from said initial cutting means and having cutting elements, said mechanism having means to feed the material to and from its cutting elements.

2. In a combined machine of the character described, means to initially cut the material, mixing and cutting mechanism having feed channels disposed side by side and into one of which said initial cutting means discharges and having also cutting elements at one end of said feed channels, and driving means for said initial cutting means and for said mixing and cutting mechanism.

3. In a combined machine of the character described, means to initially cut the material, mixing and cutting mechanism having a plurality of feed channels into one of which said initial cutting means discharges, and having cutting elements at one end of said feed channels, and provided with a controllable discharge outlet, the material when said outlet is closed being continuously circulated in said feed channels towards and from said cutting elements.

4. In a combined machine of the character described, means to initially cut the material, cutting and mixing mechanism having a plurality of feed channels, communicating with each other at their ends, and into one of which the material from said initial cutting means is discharged, and having cutting elements at one end of said feed channels, and means to prevent the material passing to said cutting elements, whereby the cut material is continuously circulated in said feed channels.

5. In a combined machine of the character described, a casing having a plurality of discharge ports, a conveyor in said casing, cutting mechanism actuated by said conveyor, a stuffing spout communicating with one of said ports, means to control the passage of material to said spout, cutting mechanism to which the initially cut material can be fed, and means to control the feed of the material to said cutting mechanism.

6. In a combined machine of the character described, initial cutting means having a casing provided with a plurality of discharge outlets, valves controlling said outlets, mixing and cutting mechanism communicating directly with one of said outlets, driving mechanism for said initial cutting means and said mixing and cutting mechanism, and means to render said initial cutting mechanism operative or inoperative.

7. In a combined machine of the character described, initial cutting means, a casing having a plurality of feed channels, one of which receives the material from said means, and having cutting elements at the one end of said feed channels, said feed channels communicating with each other at each end, a valve controlling discharge of cut material from said casing, and valves controlling the passage of material from one of said feed channels to said cutting elements and from said cutting elements to another of said feed channels.

8. In a combined machine of the character described, initial cutting means, mixing and cutting mechanism to which the material is discharged from said cutting means, and having a controllable discharge outlet, transfer mechanism to feed the material discharged from said outlet to said initial cutting means, and means to render said transfer mechanism operative or inoperative.

9. In a combined machine of the character described, initial cutting means, mixing and cutting mechanism to which the material is discharged from said cutting means, and having a controllable discharge outlet, transfer mechanism to feed the material discharged from said outlet to said initial cutting means, and means to render said initial cutting means operative or inoperative.

10. In a combined machine of the character described, initial cutting means, mixing and cutting mechanism having a plurality of feed channels, intercommunicating at each end, and having a cutting chamber communicating at one end with said feed channels, with cutting elements in said chamber, and provided with a discharge outlet, a conveyor to transfer material from said outlet to said initial cutting means, and driving mechanism for said initial cutting means, said mixing and cutting mechanism and for said conveyor.

11. In a combined machine of the character described, initial cutting means having a plurality of discharge outlets, valves for controlling said outlets, a spout connected with one of said outlets, cutting and mixing mechanism communicating with the other of said outlets, and having a controllable discharge outlet, and a conveyor to receive the material from the discharge outlet of said cutting and mixing mechanism and to convey it to said initial cutting means.

12. In a combined machine of the character described, means to first cut the material into particles of a desired size, cutting and mixing mechanism into which said means discharges and having mixing and cutting elements which effect a continuous circulation of the material to and from its cutting elements until it is reduced to a desired degree of fineness, and a valve controlling the automatic discharge of the material from said mixing and cutting mechanism.

13. In a combined machine of the character described, initial cutting means having a casing provided with material conveying and cutting elements and with a discharge port, mixing and cutting mechanism having a plurality of feed channels arranged side by side, intercommunicating at their ends and communicating at one end with a cutting chamber having cutting elements to and from which the material in said feed channels is fed, said means discharging into one of said feed channels, and a valve controlling the discharge from one of said feed channels.

14. The method of treating material, which consists in first subjecting it to a rough cut, then causing it to continuously circulate to and from cutting elements for further cutting operations until it is reduced to a desired degree of fineness, and causing a mixing action to take place during such circulation.

15. The method of treating material, which consists in first subjecting it to a rough cut, then causing it to continuously circulate to and from cutting elements for further cutting operations until it is reduced to a desired degree of fineness, causing a mixing action to take place during such circulation, and adding other material during the mixing operation.

16. The method of treating material, which consists in first subjecting it to a rough cut, then causing it to continuously circulate to and from cutting elements for further cutting operations until it is reduced to a desired degree of fineness, causing a mixing action to take place during such circulation, and packaging the treated material under pressure into containers.

17. The method of treating material, which consists in subjecting it to a cutting operation, then causing it to circulate in a closed path, during such circulation be subjected to a mixing operation, and forcing the mixed material under pressure into containers.

18. The method of treating material which consists in initially subjecting the material to a cutting operation, discharging it into an enlarged storage chamber and subjecting it to a mixing operation, and then subjecting the initially cut and mixed material to a further cutting operation.

19. The method of treating material which consists in initially subjecting the material to a cutting operation, discharging it into an enlarged storage chamber and subjecting it to a mixing operation, then subjecting the initially cut and mixed material to a final cutting operation and then packing the treated material into containers.

CHRISTOPHER OFFENHAUSER.